United States Patent [19]

Makino

[11] Patent Number: 4,747,123
[45] Date of Patent: May 24, 1988

[54] MF SIGNAL TRANSMITTING CONTROL APPARATUS/METHOD FOR USE IN CORDLESS TELEPHONE SYSTEM

[75] Inventor: Masayuki Makino, Tokyo, Japan

[73] Assignee: NEC Corporation, Tokyo, Japan

[21] Appl. No.: 837,222

[22] Filed: Mar. 7, 1986

[30] Foreign Application Priority Data

Mar. 8, 1985 [JP] Japan .................................. 60-46157

[51] Int. Cl.⁴ ............................................. H04Q 7/04
[52] U.S. Cl. ......................................... 379/62; 379/63
[58] Field of Search ..................................... 379/61, 63

[56] References Cited

U.S. PATENT DOCUMENTS

| | | | |
|---|---|---|---|
| 3,970,801 | 7/1976 | Ross et al. ............................ | 379/63 |
| 4,332,981 | 6/1982 | Palombi et al. ....................... | 379/62 |
| 4,574,163 | 3/1986 | Zato ..................................... | 379/62 |

Primary Examiner—Robert Lev
Attorney, Agent, or Firm—Sughrue, Mion, Zinn, Macpeak and Seas

[57] ABSTRACT

A multi-frequency (MF) signal transmitting control apparatus and method for use in a cordless telephone system, according to which a dial signal discrimination code within a transmitted dial signal causes an audio circuit to be turned off for a sufficient length of time to enable all of a multi-frequency signal to be sent to an exchange. As a result of the audio circuit being turned off at this point, the amount of noise received by a listener during a conversation in which dialing buttons are accidentally pressed by the bearer of the device is reduced.

12 Claims, 4 Drawing Sheets

| PREAMBLE | FRAME SYNC | DIAL DISC. CODE | DIAL NO. A | DIAL NO. A | DIAL NO. A | DIAL NO. A |
|---|---|---|---|---|---|---|

MF SIGNAL TRANSMITTING CONTROL APPARATUS/METHOD FOR USE IN CORDLESS TELEPHONE SYSTEM

BACKGROUND OF THE INVENTION

The present invention relates to a cordless telephone system and, more particularly, to a dual tone multi-frequency (DTMF) signal control apparatus/method for use in a radio fixed unit within the cordless telephone system.

When a radio channel is established between a portable unit and a radio fixed unit connected to an exchange which accommodates push-button (PB) or touch-tone telephones, the audio circuit and line relay of the fixed unit is placed in a connected state, resulting in connection between the exchange and the portable unit. Then, as its bearer dials, the portable unit sends a dial signal to the fixed unit. In response to the dial signal, the fixed unit sends to the exchange a multi-frequency (MF) (usually DTMF) signal corresponding to the dial signal.

The PB receiver of the exchange is so designed as to regard only DTMF signals as valid and to suppress all other signals as noise. Since the audio channel is maintained between the portable unit and the exchange from the time the line relay of the fixed unit becomes connected, not only the DTMF signal but also the dial signal from the portable unit is sent to the exchange. The exchange, judging the dial signal to be noise, actuates its noise suppressor circuit and temporarily disconnects the channel. Because the noise suppressor circuit has a prescribed time constant, the exchange may sometimes fail to detect a DTMF signal sent following the dial signal.

Apart from the above mentioned, there is another problem that, if the bearer of the portable unit dials, and especially if the bearer pushes the re-dial button by mistake in the middle of a conversation, the other party will hear a disagreeable click of the dial signal.

SUMMARY OF THE INVENTION

An object of the present invention, therefore, is to provide an MF signal transmitting control apparatus/method for use in a cordless telephone system by which the erroneous detection of an MF signal can be reduced.

Another object of the invention is to provide an MF signal transmitting control apparatus/method for use in a cordless telephone system by which a click resulting from accidental dialing by the bearer of a portable unit during a conversation can be suppressed and would otherwise be audible to the other party. This is because the frequency of the dial signal is within the transmission frequency band of telephone subscriber lines.

According to the invention, there is provided an MF signal transmitting control apparatus for use in a cordless telephone system which includes a fixed unit connected to an exchange and a portable unit connectable to said fixed unit by a radio channel. The apparatus includes circuitry for sending a dial signal from the portable unit to the fixed unit, the dial signal including a dial signal discrimination code and a dial number code; audio circuitry means for forming an audio channel between the exchange and the portable unit; detection circuitry for detecting the dial signal to provide detected dial signal discrimination and dial number codes; and control circuitry for keeping the audio circuit off for a first prescribed length of time after receiving the detected dial signal discrimination code and, after the lapse of the first prescribed length of time, sending from the fixed unit to the exchange an MF signal corresponding to the detected dial number code.

BRIEF DESCRIPTION OF THE DRAWINGS

The above and other objects, features and advantages of the present invention will become more apparent from the detailed description hereunder taken in conjunction with the accompanying drawings wherein.

DETAILED DESCRIPTION OF THE PREFERRED EMBODIMENT

Figure 1:
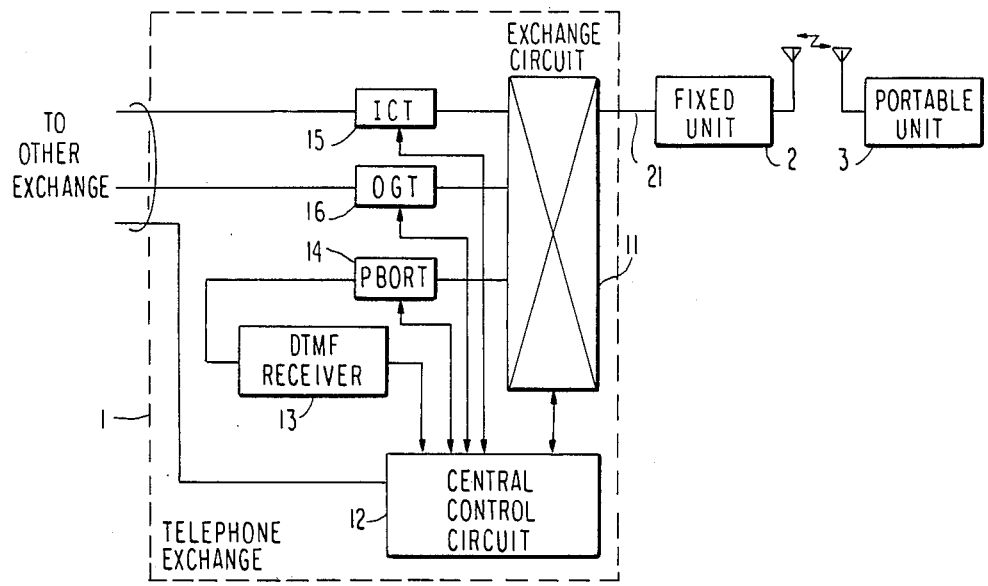
FIG. 1 is a prior art schematic block diagram of a cordless telephone system to which the invention is applicable.

Referring to FIG. 1, a radio fixed unit 2 is connected through a pair of subscriber lines 21 to an exchange circuit 11 of a telephone exchange 1 and connected to a portable unit 3 through a radio channel. The exchange 1 is coupled to other exchanges, and to the exchange circuit 11 are connected a plurality of subscriber lines besides the fixed unit 2. To the exchange circuit 11 are also connected pluralities of incoming trunks 15, outgoing trunks 16 and PB originating register trunks 14. To simplify the drawing, only one each of these trunks are shown here. To the PB originating register trunks 14 is connected a PB receiver 13, whose output is supplied to a central control circuit 12. The exchange circuit 11, incoming trunks 15, outgoing trunks 16 and PB originating register trunks 14 are under the control of the central control circuit 12.

When the portable unit 3 is placed in an off-hook state by its bearer, as will be described in detail later on, a calling signal is sent to the fixed unit 2. After establishing a radio channel, the fixed unit 2 turns on its audio circuit and line relay to connect the exchange 1 and the portable unit 3. The central control circuit 12 is monitoring subscriber lines 21 of the fixed unit 2. When the control circuit 12 detects the connection of the line relay, it enables the exchange circuit 11 to connect the PB originating register trunk 14 to the subscriber lines 21. The PB originating register trunk 14 generates a dial tone and thereby urges the bearer of the portable unit 3 to dial. The dialing of the bearer causes portable unit 3 to send a dial signal to the fixed unit 2 which in turn sends an MF signal corresponding to the dial signal to the exchange 1. In general, the MF signal is a DTMF signal which is composed of a combination of a higher and lower frequency tones. The DTMF signal is received by the PB originating register trunk 14 and detected by the PB receiver 13. On the basis of the detection output, the central control circuit 12 connects the subscriber lines 21 to a prescribed outgoing trunk 16 by controlling the exchange circuit 11.

Figure 2:
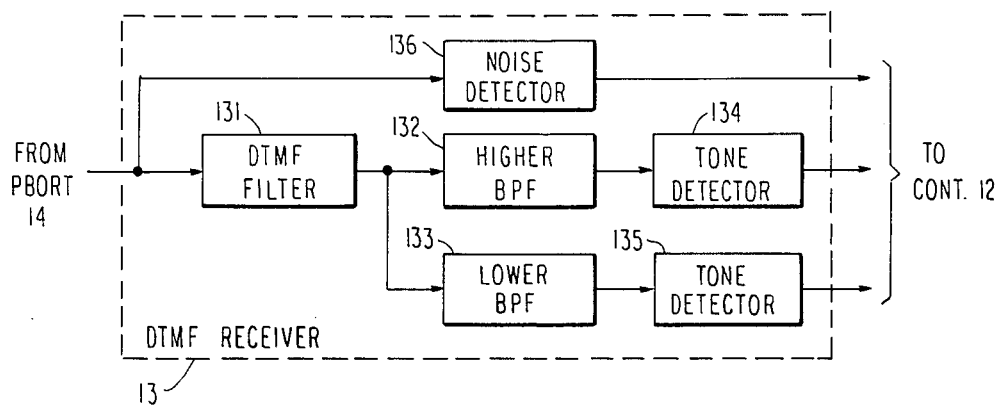
FIG. 2 is a prior art block diagram of a DTMF receiver referred to in FIG. 1.

Referring now to FIG. 2, a DTMF filter 131 passes, and supplies a higher band-pass filter (BPF) 132 for a higher frequency band and a lower BPF 133 for a lower frequency band, with a DTMF signal from the PB originating register trunk 14. The outputs of the higher and lower BPFs 132 and 133 are detected by tone detectors 134 and 135, respectively, and supplied to the central control circuit 12. A noise detector 136 detects noise (including the dial signal from the portable unit), if any, contained in signals from the PB originating register trunk 14, and informs the control circuit 12 of the presence of such noise. The noise detector 136 is composed of a BPF passing noise components and a detector and has a prescribed time constant. The control circuit 12, in order to prevent erroneous connection, prohibits reception of the outputs of the tone detectors 134 and 135 as long as noise is detected by the noise detector 136.

Figure 3A:
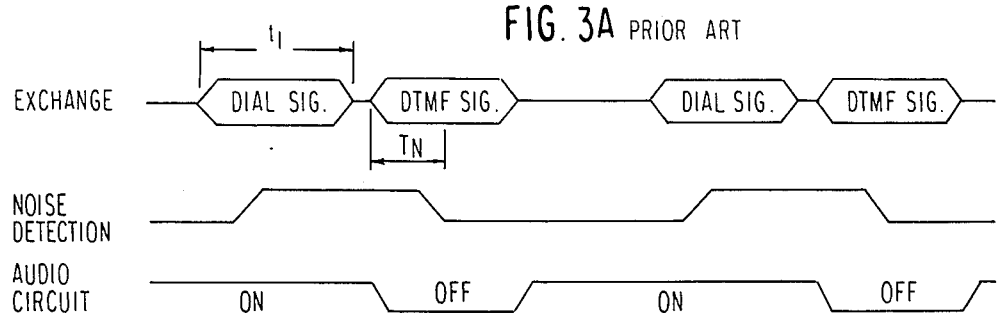
FIG. 3A is a time chart for describing a cordless telephone system of the prior art.

The radio fixed unit of the prior art, after establishing a radio channel in response to a call-up or calling signal from the portable unit, turns on the audio circuit and the line relay and, after receiving a dial signal, continuously sends corresponding DTMF signals to the exchange. Therefore, the PB receiver 13 of the exchange receives the DTMF signal immediately after the reception of the dial signal as shown at the top of FIG. 3A. Since the noise detector 136 regards the dial signal as noise and has a certain time constant, its detection output is as shown in the middle of FIG. 3A. The central control circuit does not receive the outputs of the tone detectors 134 and 135 during the leading part of the DTMF signal ($T_N$) because of the detection output of the noise detector 136. Consequently, during this period of time $T_N$, no correct DTMF signal can be received.

Furthermore, since the audio circuit is off only when a DTMF signal is sent out as shown at the bottom of FIG. 3A, if the bearer of the portable unit dials by mistake during a conversation, the dial signal will be directly heard by the other party as click noise.

Figure 4:
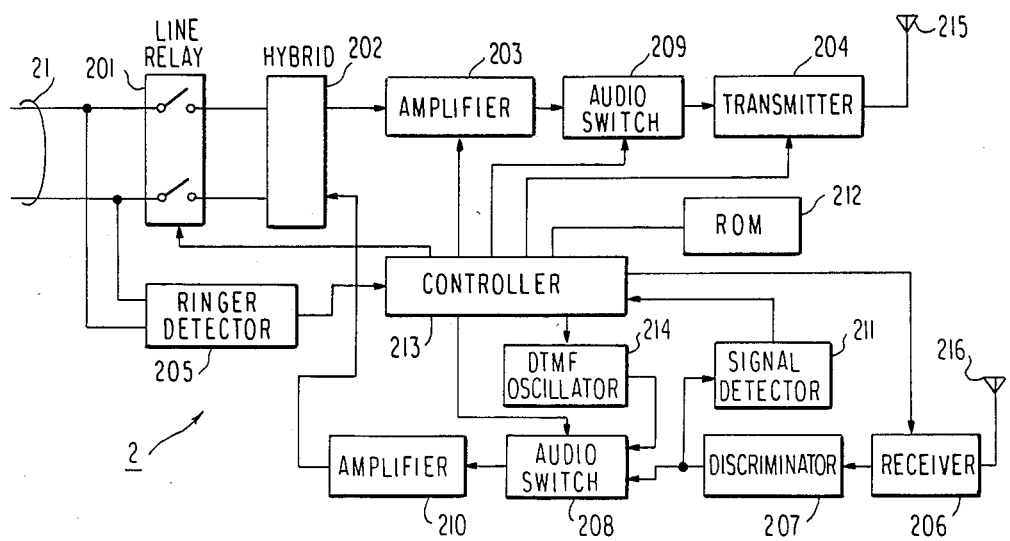
FIG. 4 is a block diagram of a radio fixed unit according to the invention.

Referring next to FIG. 4, the fixed unit 2 is connected to the exchange via the subscriber lines 21, which are connected to a line relay 201 and a ringer tone detector 205. A hybrid circuit 202 supplies an amplifier 203 with an audio signal sent via the line relay 201 and, conversely, supplies the line relay 201 with an audio signal from an amplifier 210. The audio signal amplified by the amplifier 203 is supplied through an audio switch 209 to a transmitter 204 and, after being frequency modulated, frequency-converted and otherwise processed therein, is transmitted to the portable unit by way of an antenna 215. A frequency-modulated (FM) radio carrier wave from the portable unit received by a receiving antenna 216 is demodulated by a receiver 206 and a frequency discriminator 207, whose output is supplied to a signal detector 211 as well as to the amplifier 210 through an audio switch 208. A DTMF oscillator 214 generates prescribed DTMF signals under the control of a controller 213. A readonly memory (ROM) 212 stores the identification (ID) number of the fixed unit. Control signals from the portable unit, such as a calling signal and a dial signal, are detected by the signal detector 211 and supplied to the controller 213. Other control signals including a call response signal are fed to the amplifier 203 from the controller 213 and transmitted to the portable unit.

Figures 5, 7:
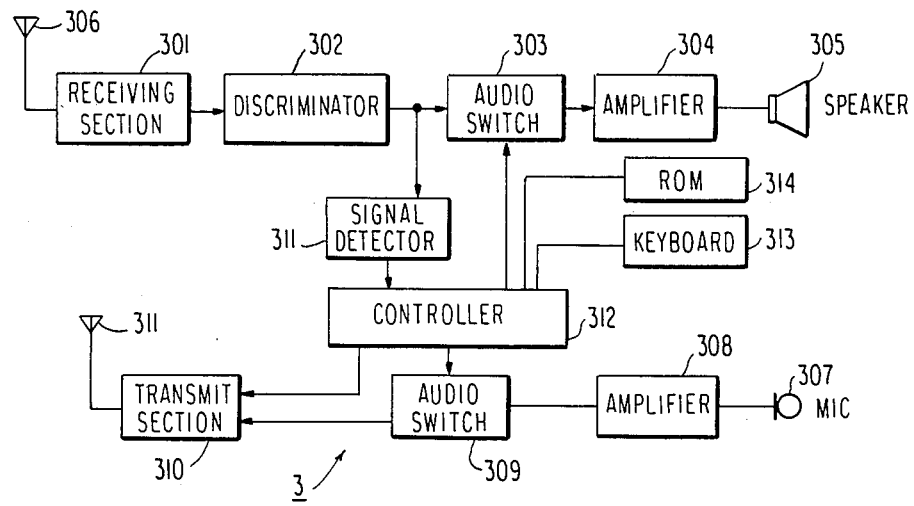
FIG. 5 is a block diagram of a portable unit according to the invention.
FIG. 7 is a diagram showing the format of dial signals used in the cordless telephone system according to the invention.

Now referring to FIG. 5, an FM radio carrier wave from the fixed unit is received by a receiving antenna 306 and supplied to a receiving section 301. The received signal, frequency-converted and otherwise processed by the receiving section 301, is demodulated by a frequency discriminator 302, and is supplied to a signal detector 311 and an audio switch 303. An audio output from the audio switch 303, after being amplified by an amplifier 304, is output from a speaker 305. The signal detector 311 detects a call response signal, a dial tone and so forth, and supplies the detected signals to a controller 312. An audio signal entered from a microphone 307, after being amplified by an amplifier 308, is supplied to a transmitting section 310 through an audio switch 309. The transmitting section 310 transmits a carrier wave, after frequency modulating, frequency-converting and otherwise processing it, to the fixed unit by way of an antenna 311. A dial number is entered from a keyboard 313, and a calling signal, a dial signal and so forth are supplied to the transmitting section 310 under the control of the controller 312. A ROM 314 stores the ID number of the portable unit 3.

Figure 6:
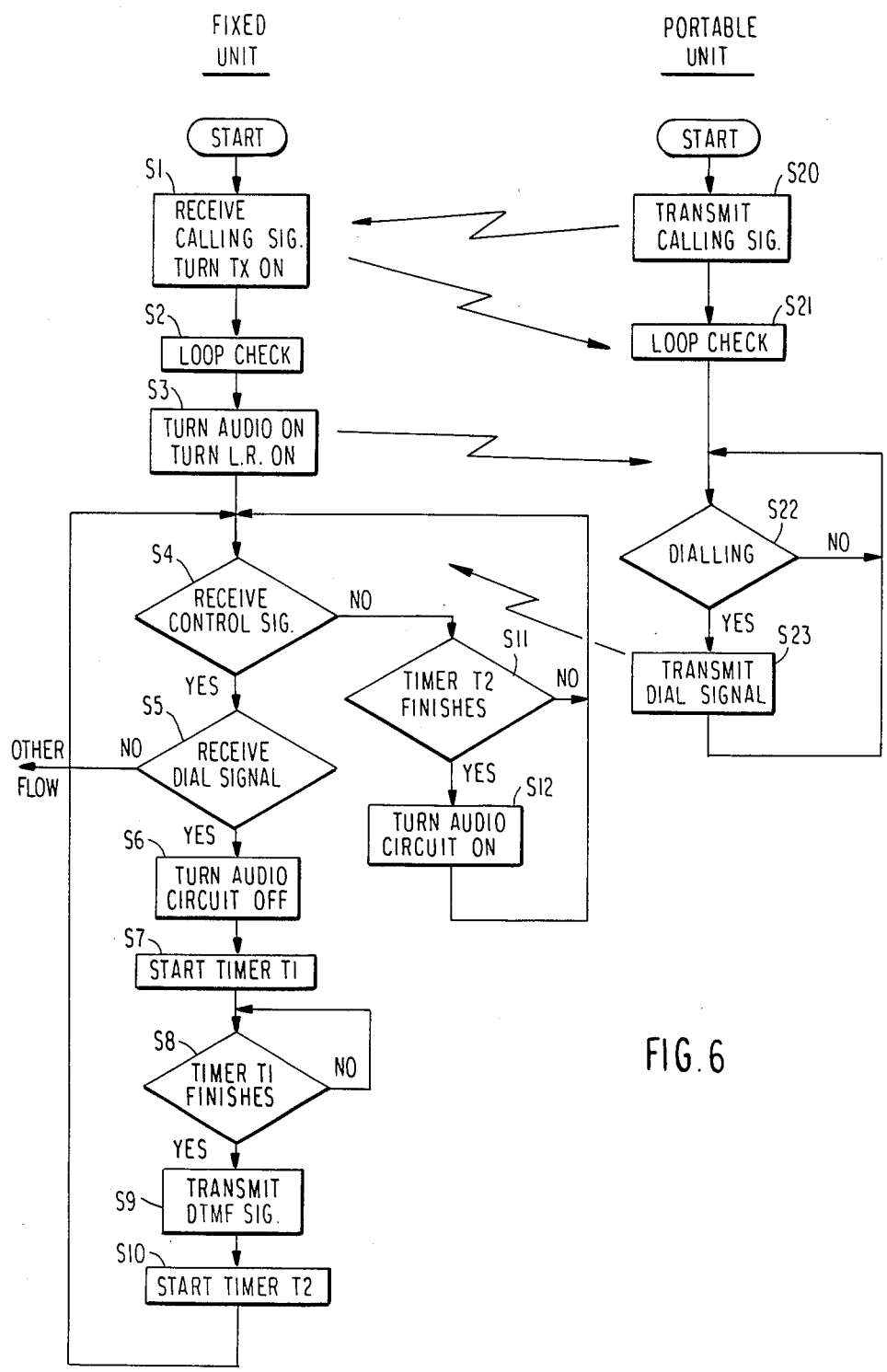
FIG. 6 is a flow chart showing the operation of the cordless telephone system according to the invention.

Next will be described the operation which characterizes the present invention with reference to the flow chart of FIG. 6. When the portable unit is placed in an off-hook state by its bearer using the keyboard 313, the unit sends a call-up or calling signal to the fixed unit (see Step S20). In response to the calling signal, the fixed unit turns on its transmitter and returns a call response signal to the portable unit (Step S1). After checking an established radio channel, the fixed unit turns on its audio circuit by closing the audio switches 208 and 209 (see FIG. 4), and at the same time connects the portable unit to the exchange by closing the line relay 201 (Steps S2, S21 and S3). Then, a dial tone from the exchange is transferred to the portable unit and, hearing this tone, the bearer of the portable unit dials. The dialing causes the controller 312 of the portable unit to send a dial signal to the fixed unit (Steps S22 and S23).

Now referring temporarily to FIG. 7, a dial signal comprises a preamble code for bit synchronization, a frame sync code for frame synchronization, a dial signal discrimination code indicating that the succeeding code is a dial number, and dial number codes A representing a dial number. Each of the dial number codes A represents one digit of the dial number, and the same code A is sent four times one after another for increasing reliability of reception, as shown in FIG. 7. Therefore, for sending a 10-digit dial number, ten dial signals of FIG. 7 are required to be sent. It should be noted, as above, that since the dial signal is within the frequency band of the subscriber line, the dial signal can reach the exchange 1 through the fixed unit 2 if the audio circuit of the fixed unit 2 is turned on.

Referring back to FIG. 6, the fixed unit checks at Step S4 whether or not a control signal, such as a dial signal, has been received and, if one has been, judges at Step S5 whether or not it is a dial signal. If it is not, the process will shift to a flow related to another control signal. If it is, the audio circuit will be temporarily turned off (Step S6). Discrimination of a dial signal from anything else is achieved with the dial signal discrimination code shown in FIG. 7.

After the audio circuit is turned off, a timer of time T1 is set, and monitoring is performed (Steps S7 and S8). A dial number code is received during this time. When the timer finishes time T1, a DTMF signal corresponding to the dial number code is sent to the exchange (Step S9). Then, the timer of time T2 is set, and the process returns to Step S4 (Step S10). Time T1 is the period of time, as shown at the top of FIG. 3B, between a dial signal and a DTMF signal on the exchange side, and is somewhat longer than the time constant of the noise detector 136 in the PB receiver (see FIG. 2).

If no control signal is received at Step S4, the process will shift to Step S11 to monitor the timer of T2. If dial signals successively come in before the timer counts out T2, the audio circuit is turned on to establish an audio channel between the portable unit and the exchange. The exchange connects the trunk of the called party, identified by the DTMF signals, to the subscriber lines 21 (see FIG. 1). The operation so far described permits a conversation to be started.

Figure 3B:
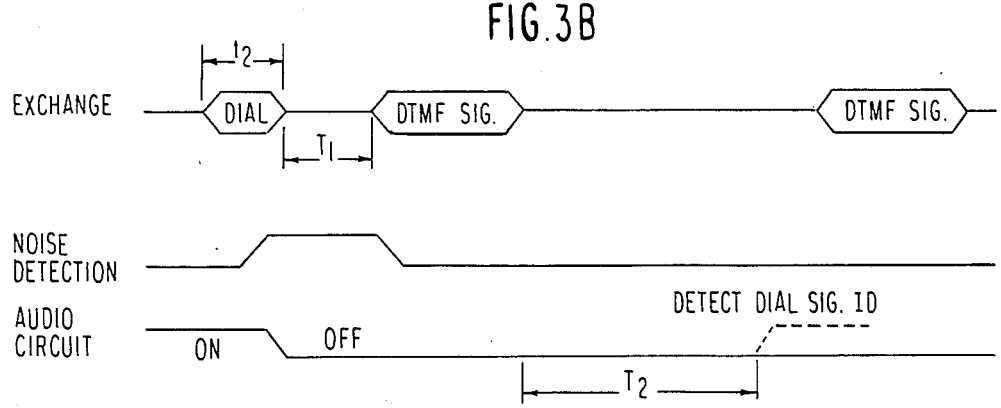
FIG. 3B is a time chart for describing a cordless telephone system according to the invention.

As shown at the top of FIG. 3B, a dial signal received on the exchange side is only partial (from the preamble to the dial signal discrimination code, in this instance), and there is no signal for the period of T1 after that. That is, the duration of the signal "DIAL" in FIG. 3B is $t_2$, sufficient to transmit the preamble, frame sync, and dial discrimination codes. $t_2$ is shorter than $t_1$, as shown in FIG. 3A. During $t_1$, all of the signals shown in FIG. 7 are transmitted. Therefore, the noise detector in the PB receiver returns to its original state, and the succeeding DTMF signals can be properly received. Further, as shown at the bottom of FIG. 3B, the audio circuit of the fixed unit is off for a prescribed period of time (T2) after the sending of each DTMF signal, so that no dial signal representing the next number is sent to the exchange side, but rather only DTMF signals are sent. Accordingly, the probability of erroneous operation by the PB receiver is further reduced. Moreover, even if the bearer of the portable unit dials by mistake during a conversation, only a part of the first dial signal is sent to the exchange side, resulting in a reduction of disagreeable noise reaching the other party.

What is claimed is:

1. A multi-frequency (MF) signal transmitting control apparatus for use in a cordless telephone system which comprises a fixed unit connected to an exchange and a portable unit connectable to said fixed unit by a radio channel, comprising:
   means for sending a dial signal from said portable unit to said fixed unit, said dial signal including a dial signal discrimination code and a dial number code following said dial signal discrimination code;
   audio circuit means for forming an audio channel between said exchange and said portable unit;
   means for detecting said dial signal to provide detected dial signal discrimination and dial number codes to said audio circuit means;
   control section means for keeping said audio circuit means turned off for a first prescribed length of time after receiving said detected dial signal discrimination code and, after the lapse of said first prescribed length of time, sending from said fixed unit to said exchange an MF signal corresponding to said detected dial number code, wherein said first prescribed length of time is sufficient to enable all of said MF signal to be sent to said exchange without interference.

2. An apparatus as claimed in claim 1 wherein said control section means further keeps said audio circuit means turned off for a second prescribed length of time after the transmission of said MF signal.

3. An apparatus as claimed in claim 1 wherein said exchange comprises a noise detector for detecting noise in signals transmitted from said fixed unit and for disabling said exchange for detection of said MF signal for a third predetermined length of time in response to detection of noise, wherein said dial signal constitutes noise, and wherein said prescribed length of time is longer than said third prescribed length of time.

4. An apparatus as claimed in claim 1 wherein said dial number code includes a plurality of codes representing the same digit.

5. An apparatus as claimed in claim 2 wherein said control section means turns on said audio circuit if no other dial signal is received within said second prescribed length of time.

6. An apparatus as claimed in claim 1 wherein said MF signal is a dual tone multi-frequency (DTMF) signal.

7. A method of transmitting a multi-frequency (MF) signal comprising the steps of:
   transmitting a call-up signal from a portable unit to a fixed unit;
   forming an audio channel between an exchange and said portable unit in response to said call-up signal from said portable unit;
   transmitting from said portable unit to said fixed unit a dial signal comprising a dial signal discrimination code and a dial number code following said dial signal discrimination code;
   keeping said audio channel turned off for a first prescribed length of time in response to the reception of said dial signal discrimination code; and
   sending from said fixed unit to said exchange an MF signal corresponding to said dial number code after the lapse of said first prescribed length of time, wherein said first prescribed length of time is sufficient to enable all of said MF signal to be sent to said exchange without interference.

8. A method as claimed in claim 7 further comprising the step of:
   keeping said audio channel turned off for a second prescribed length of time after the transmission of said MF signal.

9. A method as claimed in claim 7 wherein said exchange comprises a noise detector for detecting noise in signals transmitted from said fixed unit and for disabling said exchange for detection of said MF signal for a third prescribed length of time, wherein said dial signal constitutes noise, and wherein said first prescribed length of time is longer than said third prescribed length of time.

10. A method as claimed in claim 7 wherein said dial number code includes a plurality of codes representing the same digit.

11. A method as claimed in claim 8 further comprising the step of:
   turning on said audio channel if no other dial signal is received within said second prescribed length of time.

12. A method as claimed in claim 7 wherein said MF signal is a dual tone multi-frequency (DTMF) signal.

* * * * *

UNITED STATES PATENT AND TRADEMARK OFFICE
CERTIFICATE OF CORRECTION

PATENT NO. : 4,747,123

DATED : May 24, 1988

INVENTOR(S) : Makino

It is certified that error appears in the above-identified patent and that said Letters Patent is hereby corrected as shown below:

COLUMN 2, LINE 10    Delete "prior art".

COLUMN 2, LINE 13    Delete "prior art".

COLUMN 5, LINE 10    After "T2," insert --Steps S4 to S10 are repeated to send corresponding DTMF signals to the exchange. When the timer counts out T2,--.

Signed and Sealed this

Twenty-fourth Day of January, 1989

Attest:

DONALD J. QUIGG

*Attesting Officer*    *Commissioner of Patents and Trademarks*